United States Patent [19]
Nishino et al.

[11] Patent Number: 5,284,699
[45] Date of Patent: Feb. 8, 1994

[54] BIAXIALLY ORIENTED POLYESTER FILM

[75] Inventors: Satoru Nishino, Otsu; Koichi Abe, Kyoto; Takeo Fukuyama, Hikone; Hidehito Minamizawa, Otsu, all of Japan

[73] Assignee: Toray Industries, Inc., Tokyo, Japan

[21] Appl. No.: 996,851

[22] Filed: Dec. 21, 1992

Related U.S. Application Data

[63] Continuation of Ser. No. 461,003, Jan. 4, 1990, abandoned.

[30] Foreign Application Priority Data

| | | | |
|---|---|---|---|
| Jan. 11, 1989 | [JP] | Japan | 1-4131 |
| Feb. 16, 1989 | [JP] | Japan | 1-35118 |
| Apr. 28, 1989 | [JP] | Japan | 1-107333 |

[51] Int. Cl.$^5$ ............ B32B 7/02; B32B 5/16
[52] U.S. Cl. ............ 428/217; 428/327; 428/328; 428/329; 428/331; 428/694 SG
[58] Field of Search ........ 428/217, 327, 328, 329, 428/331, 908.8

[56] References Cited

U.S. PATENT DOCUMENTS

| | | | |
|---|---|---|---|
| 3,884,870 | 5/1975 | Dodson et al. | 260/40 |
| 3,928,697 | 12/1975 | Mallinson et al. | 428/142 |
| 4,626,463 | 12/1986 | Fujishiro et al. | 428/148 X |
| 4,778,714 | 10/1988 | Woolley et al. | 428/217 X |
| 4,922,675 | 5/1990 | Sato et al. | 428/217 X |
| 4,990,400 | 2/1991 | Endo et al. | 428/331 |
| 5,006,589 | 4/1991 | Sakamoto et al. | 428/212 X |
| 5,096,773 | 3/1992 | Sakamoto | 428/323 |

FOREIGN PATENT DOCUMENTS

| | | |
|---|---|---|
| 63-72729 | 4/1988 | Japan . |
| 230741 | 9/1988 | Japan . |
| 63-230741 | 9/1988 | Japan . |

Primary Examiner—George F. Lesmes
Assistant Examiner—Terrel Morris
Attorney, Agent, or Firm—Fish & Richardson

[57] ABSTRACT

A biaxially oriented polyester film having excellent scratch resistance and chipping resistance by the inclusion of particles (A) having an average primary particle diameter of 5–300 nm, an average degree of aggregation of 5–100 and a Mohs' hardness of 6–10 by the content of 0.01–5 wt. %. The scratch resistance and chipping resistance of the film can be further increased by the inclusion of particles (B) having an average particle diameter of 0.3–3 μm, a Mohs' hardness smaller than that of particles (A) and/or non-incorporated particles.

35 Claims, No Drawings

BIAXIALLY ORIENTED POLYESTER FILM

This application is a continuation of U.S. application Ser. No. 07/461,003, filed Jan. 4, 1990, now abandoned.

BACKGROUND OF THE INVENTION

1. Field of Invention

The present invention relates to a biaxially oriented polyester film. More specifically, the invention relates to a biaxially oriented polyester film suitable in use for wrapping films, capacitor films and magnetic tape base films, etc.

2. Description of the Prior Art

U.S. Pat. No. 3,884,870 discloses a biaxially oriented polyester film which includes an inert additive such as titanium oxide, silica or calcium carbonate to obtain good handleability and a good slipping property in the film.

However, such a conventional film does not satisfy recent severe requirements for processing the film, because the scratch resistance (the property preventing the surface of the film from being scratched) and the chipping resistance (the property preventing a substance of the film from coming off from the surface of the film) required for the film when the film is processed, for example, in a printing process to make a wrapping film or a magnetic layer application process and a calendering process to make a magnetic tape is not adequate and the demands on tapes have greatly increased associated with the increase in the speeds of these processes.

SUMMARY OF INVENTION

Accordingly, an object of the present invention is to provide a biaxially oriented polyester film having an excellent scratch resistance and an excellent chipping resistance, thereby satisfying the recent severe requipments for processing the film.

To accomplish this object, a biaxially oriented polyester film according to the present invention includes particles (A) having an average primary particle diameter of 5-300 nm, an average degree of aggregation of 5-100 and a Mohs' hardness of 6-10 at a content of 0.01-5 wt. % in the film.

The polyester of the biaxially oriented polyester film according to the present invention is not particularly restricted. However, preferably the main component of the polyester of the film is at least one polymer selected from the group consisting of polyethylene terephthalate, polyethylene-$\alpha,\beta$-bis (2-chlorphenoxy)-ethane 4,4'-dicarboxylate, polyethylene 2,6-naphthalate and polybutylene terephthalate. Among these polymers, polyethylene terephthalate is more preferable.

The average primary particle diameter of particles (A) included in the film according to the present invention is in the range of 5-300 nm, preferably 10-100 nm. When the average primary particle diameter is greater than the above range, the chipping resistance of the film decreases. When the average primary particle diameter is less than the above range, the scratch resistance of the film decreases.

The particles (A) included in the film according to the present invention must aggregate to an adequate extent. The average degree of aggregation of particles (A) in the film is in the range of 5-100, preferably 10-50. When the average degree of aggregation is smaller than the above range, the scratch resistance of the film decreases. When the average degree of aggregation is greater than the above range, not only the chipping resistance of the film decreases but also the quality of the film greatly deteriorates because large protrusions are formed on the surface of the film.

The Mohs' hardness of particles (A) must be in the range of 6-10. When the Mohs' hardness of particles (A) is less than the above range, the scratch resistance of the film decreases. Generally, the upper limit of the Mohs' hardness of the particles is 10.

The content of particles (A) in the film is controlled in the range of 0.01-5 wt. %, preferably 0.1-1 wt. %. When the content of particles (A) is less than the above range, the scratch resistance of the film decreases because the effect of reinforcing the substrate portion of the film by particles (A) decreases. When the content of particles (A) is greater than the above range, the chipping resistance of the film decreases because the content is too much and structurally the surface portion of the film is likely to be cut off or the included particles are liable to drop away from the film.

The kind of particles (A) is not particularly restricted. However, preferably the particles (A) are at least one kind of particles selected from the group consisting of alumina particles having $\beta$, $\gamma$ or $\delta$-type crystal form, zirconia particles and titanium nitride particles, because such particles can greatly increase the scratch resistance of the film. Among these particles, alumina particles are more preferable. Although there are $\alpha$, $\beta$, $\gamma$, $\delta$, $\chi$, $\eta$ and $\theta$ crystal forms of alumina particles, it is difficult for particles consisting mainly of $\alpha$, $\chi$, $\eta$ or $\theta$ crystal forms of alumina particles to increase the scratch resistance of the film. Therefore, the $\beta$, $\gamma$ or $\delta$-type crystal forms of alumina particles are preferable as particles (A). If particles (A) have a $\beta$, $\gamma$ or $\delta$-type crystal form of alumina, particles (A) may be composed of two or more types of these types crystal forms. Among these types of crystal forms, the $\delta$-type crystal form is preferable. When a large amount of $\delta$-type crystal form of alumina particles are included in the film, the scratch resistance of the film is greatly increased. Particularly when the amount of $\delta$-type crystal form of alumina particles is not less than 60% by weight, the scratch resistance of the film is much more increased. The crystal form of the alumina particles can be determined, for example, by taking the alumina particles from the film and observing and determining the crystal structures of the particles by an X-ray diffraction method.

The shape coefficient of particles (A) in the film according to the present invention is preferably in the range of 0.85-1.0, because particles (A) having such a shape coefficient can increase the scratch resistance of the film to a further extent.

Particles (A) may be added to the film together with a dispersant to increase the scratch resistance of the film. However, even in this case, the average degree of aggregation of particles (A) must be maintained in the range of 5-100 as aforementioned.

The film according to the present invention is a biaxially oriented film. In a non-stretched film or an uniaxially oriented film, a desirable scratch resistance in the film cannot be obtained and the particles included in the film or the protrusions formed by the particles on the surface of the film are likely to drop away from the film.

The planar orientation index of the biaxially oriented film according to the present invention is not particularly restricted. However, the planar orientation index is preferably in the range of 0.935-0.975, more preferably in the range of 0.940–0.970, because the film having such a planar orientation index can present high scratch resistance and high chipping resistance in the present invention. Also, the density index of the film according to the present invention is preferably in the range of 0.02–0.05, because the film having such a density index can present high scratch resistance and high chipping resistance in the present invention.

The average surface roughness Ra in the transverse direction of the film according to the present invention is preferably in the range of 0.003–0.030 μm to obtain high scratch resistance and chipping resistance of the film.

The friction coefficient μk of the surface of the film according to the present invention is preferably in the range of 0.20–0.35 to obtain a high scratch resistance of the film.

The surface specific resistivity of the film according to the present invention is preferably less than $1 \times 10^{15}$ Ω-cm to obtain high scratch resistance and chipping resistance of the film. When the surface specific resistivity is greater than the above value, the film powder which drops away from the film tends to grow to a block by static electricity etc., and the block of powder is likely to injure the surface of the film during processing the surface, for example, while forming a magnetized surface.

The orientation ratio in the transverse direction of the film according to the present invention is preferably in the range of 30–80 to obtain a high scratch resistance of the film.

In the film according to the present invention, particles other than particles (A) may be included in the film unless the object of the present invention is obstructed. Especially, it is preferable that the film includes particles (B) having a Mohs' hardness smaller than that of particles (A) and an average particle diameter of 0.3–3 μm together with particles (A), because the inclusion of such particles (B) can further increase the run ability and scratch resistance of the film. When the Mohs' hardness of particles (B) is less than 6, preferably less than 5, more preferably less than 4, the scratch resistance can be further increased. Moreover, when the film includes both of particles (A) and particles (B), the difference between the Mohs' hardness of the particles (A) and the Mohs' hardness of particles (B) is preferably not less than 1, more preferably not less than 2, to obtain a higher scratch resistance of the film. Furthermore, the coefficient of crystallization acceleration of particles (B) is preferably not greater than 15° C., because the inclusion of such particles (B) can further increase the scratch resistance of the film. There are several methods to control the coefficient of crystallization acceleration of particles (B) to a value of not greater than 15° C., in accordance with the kind of the particles (B). For example, it is possible to control the coefficient in the desired range by controlling the pH of the slurry of the particles (B) or adequately selecting the kind or amount of the dispersant in the slurry. With respect to the kind of particles (B), various kinds of inorganic particles and organic particles can be adopted. For instance, particles (B) are at least one kind of particles selected from the group consisting of inorganic particles such as calcium carbonate, calcium phosphate and silica particles and organic polymeric particles such as bridged spherical polystyrene particles. Particularly calcium carbonate particles or organic polymeric particles are preferable for particles (B). Such particles (B) as described in the above are included in the film preferably in the range of 0.005–1.0 wt. %, more preferably 0.05–0.5 wt. %.

In the film including particles (A) and particles (B) according to the present invention, the substrate portion of the film comprising the polyester of the film can be reinforced mainly by particles (A) whose average particle diameter is relatively small, whose Mohs' hardness is relatively high and whose content in the film is relatively great, thereby increasing the scratch resistance of the film to a great extent. The surface of the film can be roughened and the friction coefficient of the film surface can be decreased mainly by particles (B) whose average particle diameter is relatively large, whose Mohs' hardness is relatively low and whose content in the film is relatively small, thereby further increasing the scratch resistance of the film. Accordingly, since the protrusions formed by particles (B) on the film surface are maintained to be relatively soft, for example, in a process of manufacturing a magnetic tape or winding the magnetic tape, the magnetized surface of the film can be prevented from being scratched by the base film surface opposite to the magnetized surface when the base film surface comes into contact with the magnetized surface. Moreover, since particles (B) and the protrusions formed by particles (B) can be strongly held by the substrate portion of the film as a result of the substrate portion being reinforced by particles (A), particles (B) or the protrusions thereof do not readily fall away from the film surface, thereby further increasing the scratch resistance and chipping resistance of the film.

In the present invention, the film may further include non-incorporated particles together with particles (A) or together with particles (A) and particles (B), to further increase the scratch resistance and chipping resistance of the film. The non-incorporated particles according to the present invention are the particles which are generated by combining the polyester component with at least one kind of compound selected from the group consisting of a calcium compound, a magnesium compound and a lithium compound which is added when the polyester is polymerized. The non-incorporated particles may include a fine amount of phosphorus and/or a fine amount of other metal component such as zinc, cobalt, antimony, germanium and titanium as long as the advantages according to the present invention can be maintained.

The average particle diameter of the non-incorporated particles is preferably in the range of 0.2–20 μm, more preferably in the range of 0.3–10 μm, to effectively increase the scratch resistance and chipping resistance of the film. Also, the content of the non-incorporated particles in the film is preferably in the range of 0.01–2 wt. %, more preferably in the range of 0.05–1 wt. %, to increase the scratch resistance and chipping resistance of the film.

The average particle diameter of the non-incorporated particles is large in comparison with that of particles (A), and the non-incorporated particles mainly function to form fine protrusions on the film surface and to decrease the friction coefficient of the film surface by the protrusions. Since the relatively smaller protrusions due to particles (A) are also formed on the film surface in addition to the protrusions due to the non-incorporated particles, the friction coefficient of the film surface can be further decreased. Moreover, since the non-incorporated particles are formed integrally with the substrate portion of the film in the generation process thereof, the non-incorporated particles can reinforce the substrate portion of the film, strongly suppress the dropping of the film powder from the film and greatly increasing the scratch resistance and chipping resistance of the substrate portion of the film.

The film according to the present invention may be laminated on, at least, one surface of a polyester film to form a composite polyester film. The polyester film to be laminated may be any one of a non-stretched film, an uniaxially oriented film and a biaxially oriented film. In the case where the polyester film to be laminated is also a biaxially oriented polyester film, the lamination can be carried out in a die which delivers the molten polyester in a sheet formation or in a pipe connected to the die, whereby the molten polyester is delivered into the die. By this lamination, the surface of the composite polyester film can have an excellent scratch resistance and an excellent chipping resistance, as aforementioned. In this composite polyester film, it is desirable to set the ratio between the total thickness of the composite film and the thickness of the film according to the present invention in the range of 150:1 to 2:1, because, in such a composite film, the generation of film powder can be greatly suppressed when the composite film is slitted.

Next, the method for manufacturing the film according to the present invention will be explained.

First, particles (A) are added to a polyester. Although the particles (A) may be added at any time of before, during or after the polymerization of the polyester, preferably particles (A) formed as a slurry are added to ethylene glycol etc., which is a diol component of the polyester, by mixing and dispersing the slurry, because the advantages due to such inclusion of particles (A) in the present invention can be further increased. When particles (A) are added, a media dispersion method, wherein, after the particles (A) are dispersed utilizing glass beads as a media, the glass beads are removed, is very effective to control the average degree of aggregation of the particles (A) in the range according to the present invention. In this method, preferably the size of the glass beads is in the range of 10-300 μm, the rotational speed in the range of 2000-8000 rpm and the dispersion time in the range of 1-9 hours, in order to control the average degree of aggregation within the range according to the present invention more precisely and easily. Furthermore, since particles (A) have relatively high Mohs' hardness in the present invention, the inner surface of a stirring tank and the outer surface of its stirring blade are desirably processed to or lined with hardfaced surfaces. Furthermore, the method, wherein the particles (A) are heat treated at the stage of the ethylene glycol slurry, is also very effective to control the average degree of aggregation within the range according to the present invention.

As a method for controlling the content of particles (A) and (B), the method for diluting master pellets having a high concentration when the pellets are served to a film manufacturing process is preferable to ensure the advantages due to the present invention.

After the polyester including particles (A) or particles (A) and (B) is sufficiently dried, the polyester is supplied to an extruder. Subsequently, after the polyester is filtered with a high accuracy, a molten polyester sheet is delivered from the slit of a die, and a non-stretched film is formed by cooling the molten polyester sheet. This filtering with high accuracy is very effective in controlling the average degree of aggregation of particles (A) in the range according to the present invention. Also in this filtering, controlling the filtering pressure in the range of 60-120 kg/cm$^2$ is effective to control the average degree of aggregation. In the above casting of the molten polyester sheet from the die, controlling the draft ratio (the ratio between the width of the slit of the die and the thickness of the obtained non-stretched film) in the relatively high range of 3-10 is also effective to more easily control the average degree of aggregation in the range according to the present invention.

Subsequently, the non-stretched film is biaxially stretched and biaxially oriented. As a stretching method, a sequential biaxially stretching method or a simultaneous biaxially stretching method can be applied. In these methods, the sequential biaxially stretching method wherein firstly its longitudinal stretching is carried out and subsequently its transverse stretching is carried out is more preferable to increase the scratch resistance of the obtained biaxially oriented film.

The longitudinal stretching is preferably carried out at a temperature of 100°-130° C. and at a total stretch ratio of 4-5 with two or three stretching steps in order to control the average degree of aggregation in the range according to the present invention more easily. The transverse stretching is preferably carried out at a temperature of 80°-120° C. and at a stretch ratio of 3-5. This temperature during the transverse stretching is preferably lower than the temperature during longitudinal stretching.

The film having been biaxially stretched may be further stretched at least in one direction. Furthermore, the biaxially stretched film may be heat treated as required. This heat treatment is carried out preferably at a temperature of 180°-230° C., more preferably 190°-220° C., under the condition of a constant length and for the period of time of 0.5-30 seconds.

In the manufacture of the film including particles (A) and particles (B), high concentration master polyester pellets including particles (A) and those including particles (B) may be separately made, and these master pellets may be mixed at a required rate. More preferably, however, both particles (A) and particles (B) are added to the polyester at a predetermined mixing ratio and at a high concentration when the polyester is polymerized or when master pellets are made, and the master pellets obtained are diluted with other chips or pellets to control the concentration to a target value when the film is manufactured.

In the film further including non-incorporated particles according to the present invention, the following method for generating the non-incorporated particles is effective.

Namely, the non-incorporated particles are generated by adding a soluble compound comprising at least one of a calcium compound, a magnesium compound, a manganese compound and a lithium compound and preferably phosphoric acid and/or an ester compound to glycol by an appropriate method, in the process of a) the condensation polymerization process of a dicarboxylic acid and ethylene glycol via their direct esterification or b) the condensation polymerization process of the dimethylester of a dicarboxylic acid and ethylene glycol via their transesterification. The addition of the compound for generating the non-incorporated particles is desirably carried out by adding at least one of calcium compound and lithium compound formed as a glycol solution to a reaction system during an appropriate time between the time when the esterification or the transesterification substantially has been finished and the time when the condensation polymerization has not been advanced too much.

With the above calcium, magnesium, manganese and lithium compounds, an inorganic acid salt such as a halogenide, a nitrate and a sulfate, an organic acid salt such as an acetate, an oxalate and a benzoate, or a compound soluble to glycol such as a hyride or an oxide is preferably used, and two or more kinds of these compounds or salts may be utilized.

With the phosphoric compound, at least one of phosphoric acid, phosphorous acid, phosphinic acid and the ester and partial ester of these acids are preferably used.

In the case where particles (A) and non-incorporated particles are included in the film according to the present invention, particles (A) are preferably dispersed before the non-incorporated particles are generated, i.e. in the slurry stage of ethylene glycol in order to further increase the scratch resistance of the film.

METHODS FOR DETERMINING THE CHARACTERISTICS IN THE PRESENT INVENTION

Methods for determining or estimating the characteristics in the present invention will be explained.

(1) Average Particle Diameter

Particles are dispersed uniformly in ethylene glycol to make a slurry, the slurry is diluted to a concentration convenient for the determination, and the particle diameter distribution of the slurry is determined by a decanter type particle diameter measuring apparatus (SA-CP2 produced by Shimazu Seisakusho, a Japanese company). The particle diameter distribution obtained are plotted on a logarithmic probability paper, and the median diameter of the point at which the integrating through percentage becomes 50% is defined as the average particle diameter of the particles.

(2) Average Primary Particle Diameter, Average Degree of Aggregation

The film including particles is cut in a cross sectional direction to make a very thin piece having a thickness of 1,000Å. When the thin piece is observed at a magnification of about 100,000 using a transmission type electron microscope (for example, JEM-1200EX produced by Nippon Denshi, a Japanese company), a minimum particle diameter (a primary particle diameter), at which the observed particles cannot be further divided, can be observed and measured. This observation is carried out on 500 fields of view, and the average value is defined as the average primary particle diameter of the particles.

Since aggregated particles can be observed in a similar manner, the number of particles which constitute one aggregated particle is determined. The average counted value on 500 fields of view is defined as the average degree of aggregation of the particles.

(3) Content of Particles

The polyester constituting the film and including particles is asked by 1 gram by a plasma production apparatus. The amount of elements constituting the particles are determined by an atomic absorption analysis apparatus (for example, AA-680 produced by Shimazu Seisakusho), and the weight percentage of the particles in the polyester can be determined from the amounts of the elements in consideration of the molecular weight of the particles. The chemical composition of the particles can be determined, for example, by X-ray diffraction method.

In the case of organic particles, the content of the particles can be determined utilizing a method or an apparatus such as a thermal decomposition gas chromatography, infrared absorption or Raman scattering and SEM-XMA, as needed.

(4) Coefficient of Crystallization Acceleration

The difference between the cold crystallization temperature Tcc and the glass transition point Tg of the polymer determined by DSC (differential scanning calorimeter, DSC-II produced by Perkin Elmer) is defined as $\Delta Tcg$. $\Delta Tcg(I)$ of the polyester including 1 wt. % particles and $\Delta Tcg(II)$ of the polyester having the same viscosity and not including particles are determined, and $\Delta Tcg(II) - \Delta Tcg(I)$ is defined as the coefficient of crystallization acceleration of the particles.

The conditions of the determination of the DSC are as follows. The sample of 10 mg is set into the DSC. After the sample is molten at a temperature of 300° C. for five minutes, the sample is rapidly cooled in liquid nitrogen. The cooled sample is heated at a speed of 10° C./min., and the glass transition point Tg of the sample is detected. The sample is further heated, and the cold crystallization temperature Tcc of the sample is determined by detecting the peak temperature of the heat of the crystallization from the glass state.

(5) Chipping Resistance

A single-edged blade is perpendicularly brought into contact with a film tape slitted at a width of ¼ inch, and in the stage wherein the blade is further pressed into the tape by 0.5 mm in depth, the tape is run by 20 cm (running tension: 500 g, running speed: 6.7 cm/sec.). After this running, the height of the substance chipped away from the surface of the tape and adhering onto the edge of the blade is measured by observation using a microscope (the unit is μm.). When the height is not greater than 8 μm, the chip resistance is determined to be "good". When the height is greater than 8 μm, the chip resistance is determined to be "bad". This value of 8 μm is the critical value of whether the film powder generated by the abrasion of the film surface, when the film is processed or when the film product is running, affects the quality of the film product or not.

(6) Scratch Resistance

The film is slitted to a tape having the width of ¼ inch. The tape is run on and through the tape guide pin for a video cassette tape of a tape runability test machine TBT-300H (produced by Yokohama System Kenkyusho, a Japanese company) under the conditions of a temperature of 20° C., a humidity of 60%RH, a tension of 30 g, a running speed of 250 m/min., and a contact angle to the guide pin of 60°. The guide pin is constructed from stainless steel and the surface roughness of the guide pin is about 50 nm by Ra and about 2500 nm by Rt. The amount of the scratch generated on the tape surface from the starting position to the 90 m position far from the starting position standard is determined by observation. The determination standard is defined as follows.

There is not any scratch at all . . . 5 points
There are some shallow scratches . . . 3 points
There are many deep scratches . . . 1 point The middle state between 5 points state and 3 points state is defined as 4 points, and the middle state between 3 points state and 1 point state is defined as 2 points. This determination is repeated ten times, and the average value is defined as the point of scratch resistance. The scratch resistance having a point of not less than 4 points is determined to be "good", and the scratch resistance having a point of smaller than 4 points is determined to be "bad". The film having a point of scratch resistance smaller than 4 points deteriorates the quality of its film product because the film surface abrades and deep scratches are generated on the film surface when the film is made to a product.

(7) Shape Coefficient

Particles are observed by an electron microscope, the maximum diameter and the circle equivalent diameter of a single particle is determined and the ratio between the maximum diameter and the circle equivalent diameter is calculated. The determination of 500 particles are carried out and the average value of the ratios of the maximum diameters and the circle equivalent diameters of these particles is defined as the shape coefficient of the particles.

(8) Surface Roughness

The determination is carried out using microfigure measuring instrument ET-10 (produced by Kosaka Kenkyusho, a Japanese company). The average value of the data of 20 times measurements is defined as the surface roughness of the film according to the present invention. The conditions of the measurement are as follows.

| | |
|---|---|
| The radius of the tip of the stylus: | 0.5 μm |
| The load of the stylus: | 5 mg |
| The length of the measurement: | 1 mm |
| The cut-off value: | 0.08 mm |

(9) Orientation Ratio in the Transverse Direction of a Film

The refractive index in the longitudinal direction $n_{MD}$, the refractive index in the transverse direction $n_{TD}$ and the refractive index in the thickness direction $n_Z$ of a biaxially oriented film are measured, respectively, by an Abbe refractometer using a light source of sodium D ray (wave length: 589 nm). The orientation ratio in the transverse direction of the film is defined by the following equation.

$$(-n_{MD}+2\,n_{TD}-n_Z)/(3\times n_Z)\times 1000$$

In the above measurement, methylene iodide is used as the mount liquid, and the measurement is carried out under the conditions of a temperature of 25° C. and a humidity of 65%RH.

(10) Mohs' Hardness of Particles

The sample having the same composition and structure as those of the particles included in the film is made, or the sample is made from a mineral before it is milled to particles. The sample is scratched by a standard mineral for the determination of Mohs' hardness each other, and the Mohs' hardness of the sample is determined by 0.1 unit by observing whether the sample is scratched or not.

When the sample having the same composition and structure as those of the particles included in the film cannot be made, the Mohs' hardness of the particles is estimated from the Mohs' hardnesses of a plurality of minerals having the compositions and structures close to those of the particles in consideration of the crystal structure of the particles.

(11) Planar Orientation Index

The refractive index in the thickness direction A of a biaxially oriented film and the refractive index in the thickness direction B of a non-oriented film made by, after melting and pressing the biaxially oriented film, rapidly cooling the film in the water having a temperature of 10° C. are measured, respectively, by an Abbe refractometer using a light source of sodium D ray (wave length: 589 nm). The planar orientation index is defined as the value of A/B. Methylene iodide is used as the mount liquid, and the measurement is carried out under the conditions of a temperature of 25° C. and a humidity of 65%RH.

(12) Density Index

The density $\rho_1$ (g/cm$^3$) of the film is determined using a density gradient tube constructed from n-heptane/carbon tetrachloride. After the film is molten and pressed, the molten film is rapidly cooled in the water having a temperature of 10° C. to make a non-oriented film, and the density $\rho_2$ of the non-oriented film is determined. The difference ($\rho_1-\rho_2$) between the density $\rho_1$ and the density $\rho_2$ is defined as the density index of the film.

(13) Friction Coefficient μk

The tape made from the film and having the width of ½ inch is run using a tape runability test machine TBT-300H (produced by Yokohama System Kenkyusho) under the conditions of a temperature of 20° C. and a humidity of 60%RH. The initial friction coefficient of the tape is determined in accordance with the following equation;

$$\mu k=0.733\log(T_1/T_o)$$

wherein, $T_o$ is the tension on the entrance side and $T_1$ is the tension on the exit side. The guide pin is constructed from a stainless steel (SUS27), the surface roughness thereof is 0.2S, the contact angle of the tape to the guide pin is 180°, and the running speed is 3.3 cm/second.

(14) Surface Specific Resistivity

It is determined by an ultra-insulation resistance tester VE-40 (produced by Kawaguchi Denki Seisakusho, a Japanese company).

DETAILED DESCRIPTION OF THE PREFERRED EMBODIMENTS

Some preferred embodiments of the present invention will be hereunder described.

EXAMPLE 1 (TABLE 1)

Particles (A) being alumina particles having δ-type crystal form and having an average primary particle diameter of 20 nm, a Mohs' hardness of 7.5 are dispersed uniformly in ethylene glycol by a media dispersion method using glass beads having a particle diameter of 50 μm (rotational speed: 3,000 rpm, dispersion time: 4 hours), and the ethylene glycol including the particles (A) is polymerized with dimethylterephthalate to make pellets (A) of polyethylene terephthalate. The content of particles (A) in the polyester is 1.0 wt. %.

Next, particles (B) being heavy calcium carbonate particles having a Mohs' hardness of 3 are dispersed in ethylene glycol by a media dispersion method after adding ammonium phosphate as a dispersant, and the ethylene glycol including the particles (B) is polymerized with dimethylterephthalate to make pellets (B) of polyethylene terephthalate. The average particle diameter of particles (B) is 1.0 μm and the content thereof in the polyester is 1.0 wt. %. The coefficient of crystallization acceleration of the particles (B) is 10° C.

Next, 33 parts by weight of the pellets (A), 20 parts by weight of the pellets (B) and 47 parts by weight of pellets (C) which do not substantially include any particles are mixed, and the mixed pellets are dried for 3 hours at a temperature of 180° C. The pellets are supplied into an extruder, and after the polymer from the extruder is filtered with a high accuracy (with a 5 μm cut filter) at a filtering pressure of 95 kg/cm², the polymer is delivered from a die at a temperature of 300° C. onto a casting drum. The molten sheet is casted by an electrostatic casting method and cooled by the casting drum having a surface temperature of 30° C. to make a non-stretched film having a thickness of about 150 μm. In this casting, the draft ratio is 8.

This non-stretched film is stretched in the longitudinal direction at a temperature of 123° C. in three stages of the first magnification of 1.2, the second magnification of 1.45 and the third magnification of 2.3. The uniaxially oriented film obtained is stretched in the transverse direction at a temperature of 100° C. by a stenter and heat treated for five seconds at a temperature of 210° C. under the condition of a constant width to make a biaxially oriented film having a thickness of 12 μm.

In this biaxially oriented film obtained, the average degree of aggregation of the alumina particles included in the film is 20. The average surface roughness of the film is 0.0145 μm. When the scratch resistance of the film is determined, it presents a very good value of 4.7 point. Also, the chipping resistance of the film presents a very good value of 4.3 μm.

As is evident from this Example 1, in a case where the average primary particle diameter, the average degree of aggregation and the content of particles are in the range specified by the present invention, the film obtained can present a good scratch resistance and a good chipping resistance.

EXAMPLES 2-6, COMPARATIVE EXAMPLES 1-8 (TABLE 1)

The various biaxially oriented films are made by varying the Mohs' hardness, average primary particle diameter, average degree of aggregation and content of the particles included in the film.

When all of the Mohs' hardness, average primary particle diameter, average degree of aggregation and content of the particles are in the range specified by the present invention, a good scratch resistance and a good chipping resistance of the film can be obtained (Examples 2-6).

However, when any one of the Mohs' hardness, average primary particle diameter, average degree of aggregation and content of the particles included in the film is not in the range according to the present invention, it cannot be done to satisfy both of the scratch resistance and the chipping resistance of the film (Comparative Examples 1-8).

EXAMPLES 7-11 (TABLE 2)

Only particles (B) are varied, and other conditions are the same as those in Example 1. Since the average particle diameter, coefficient of crystallization acceleration and Mohs' hardness of particles (B) is within the range specified by the present invention and the kind of particles (B) is a kind restricted by the present invention, a good scratch resistance and a good chipping resistance of the film can be obtained.

EXAMPLES 12-16 (TABLE 3)

An additive for polymerization of polyester is selected so as to be able to generate non-incorporated particles, and δ-type alumina particles having various average primary particle diameters within the range according to the present invention are selected as particles (A). The particles (A) are dispersed uniformly in ethylene glycol, the ethylene glycol including the particles (A) is heat treated for two hours at a temperature of 195° C., and the polyester having a high concentration of particles (A) (master pellets) is made by the condensation polymerization after the transesterification with terephthalic acid dimethyl.

Each of the master pellets obtained is mixed with polyester pellets including no particles (A) so as to control the content of particles (A) in the range according to the present invention. Other conditions for making a biaxially oriented film are the same as those in Example 1. As is evident from comparing aforementioned Example 6 with Example 14, the scratch resistance and chipping resistance of the film can be further increased by non-incorporated particles.

Although several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

TABLE 1

| | Particles (A) | | | | Particles (B) | | | | Chipping resistance (μm) | Scratch resistance (point) |
|---|---|---|---|---|---|---|---|---|---|---|
| | Kind of particles | Mohs' hardness | Average primary particle diameter (nm) | Average degree of aggregation | Content (wt. %) | Kind of particles (coefficient of crystallization acceleration) | Mohs' hardness | Average particle diameter (μm) | Content (wt. %) | | |
| Exam. 1 | alumina (δ) | 7.5 | 20 | 20 | 0.33 | heavy calcium carbonate (10° C.) | 3 | 1.0 | 0.20 | 4.3 (good) | 4.7 (good) |
| Exam. 2 | zirconia | 9 | 40 | .15 | 0.40 | heavy calcium | 3 | 1.0 | 0.20 | 4.5 | 4.5 |

TABLE 1-continued

| | Particles (A) | | | | Particles (B) | | | | Chipping resistance (μm) | Scratch resistance (point) |
|---|---|---|---|---|---|---|---|---|---|---|
| | Kind of particles | Mohs' hardness | Average primary particle diameter (nm) | Average degree of aggregation | Content (wt. %) | Kind of particles (coefficient of crystallization acceleration) | Mohs' hardness | Average particle diameter (μm) | Content (wt. %) | | |
| Exam. 3 | alumina (γ) | 7.2 | 22 | 30 | 0.50 | Heavy calcium carbonate (10° C.) | 3 | 1.0 | 0.20 | 5.2 (good) | 4.2 (good) |
| Exam. 4 | titanium nitride | 10 | 50 | 30 | 0.50 | not included | — | — | — | 3.5 (good) | 4.0 (good) |
| Exam. 5 | alumina (β) | 7 | 50 | 30 | 0.30 | heavy calcium carbonate (10° C.) | 3 | 1.0 | 0.20 | 6.5 (good) | 4.0 (good) |
| Exam. 6 | alumina (δ) | 7.5 | 20 | 20 | 0.80 | not included | — | — | — | 3.5 (good) | 4.0 (good) |
| Comp. Exam. 1 | zirconia | 9 | 350 | 5 | 0.15 | heavy calcium carbonate (10° C.) | 3 | 1.0 | 0.20 | 15.5 (bad) | 1.0 (bad) |
| Comp. Exam. 2 | alumina (δ) | 7.5 | 15 | 25 | 6.0 | heavy calcium carbonate (10° C.) | 3 | 1.0 | 0.20 | 15.0 (bad) | 1.5 (bad) |
| Comp. Exam. 3 | zirconia | 10 | 15 | 25 | 0.005 | heavy calcium carbonate (10° C.) | 3 | 1.0 | 0.20 | 6.5 (good) | 1.0 (bad) |
| Comp. Exam. 4 | alumina (δ) | 7.5 | 15 | 150 | 0.30 | heavy calcium carbonate (10° C.) | 3 | 1.0 | 0.20 | 17.0 (bad) | 1.5 (bad) |
| Comp. Exam. 5 | alumina (δ) | 7.5 | 15 | 3 | 0.50 | heavy calcium carbonate (10° C.) | 3 | 1.0 | 0.20 | 5.5 (good) | 1.0 (bad) |
| Comp. Exam. 6 | calcium carbonate | 3 | 100 | 10 | 0.30 | heavy calcium carbonate (10° C.) | 3 | 1.0 | 0.20 | 12.5 (bad) | 1.5 (bad) |
| Comp. Exam. 7 | alumina (δ) | 7.5 | 2 | 80 | 0.30 | heavy calcium carbonate (10° C.) | 3 | 1.0 | 0.20 | 6.5 (good) | 1.0 (bad) |
| Comp. Exam. 8 | not included | — | — | — | — | heavy calcium carbonate (10° C.) | 3 | 1.0 | 0.20 | 11.0 (bad) | 1.0 (bad) |

TABLE 2

| | Particles (A) | | | | Particles (B) | | | | Chipping resistance (μm) | Scratch resistance (point) |
|---|---|---|---|---|---|---|---|---|---|---|
| | Kind of particles | Mohs' hardness | Average primary particle diameter (nm) | Average degree of aggregation | Content (wt. %) | Kind of particles (coefficient of crystallization acceleration) | Mohs' hardness | Average particle diameter (μm) | Content (wt. %) | | |
| Exam. 7 | alumina (δ) | 7.5 | 20 | 20 | 0.33 | spherical colloidal silica (8° C.) | 6 | 0.6 | 0.15 | 4.8 (good) | 4.0 (good) |
| Exam. 8 | alumina (δ) | 7.5 | 20 | 20 | 0.33 | heavy calcium carbonate (10° C.) | 3 | 1.5 | 0.10 | 4.5 (good) | 4.5 (good) |
| Exam. 9 | alumina (δ) | 7.5 | 20 | 20 | 0.33 | crosslinked polystyrene (2° C.) | 1 | 0.8 | 0.15 | 3.5 (good) | 4.8 (good) |
| Exam. 10 | alumina (δ) | 7.5 | 20 | 20 | 0.33 | heavy calcium carbonate (20° C.) | 3 | 1.0 | 0.20 | 7.5 (good) | 4.0 (good) |
| Exam. 11 | alumina (δ) | 7.5 | 20 | 20 | 0.33 | calcium phosphate (10° C.) | 3 | 1.0 | 0.20 | 5.5 (good) | 4.0 (good) |

TABLE 3

| | Particles (A) | | | | | Scratch resistance (point) | Chipping resistance (μm) |
|---|---|---|---|---|---|---|---|
| | Particles | Average primary particle diameter (nm) | Mohs' hardness | Content (wt. %) | Average degree of aggregation | | |
| Exam. 12 | alumina (δ) | 20 | 7.5 | 0.05 | 20 | 4.2 | 3.4 |

TABLE 3-continued

| | Particles | Particles (A) | | | | Scratch resistance (point) | Chipping resistance (μm) |
| | | Average primary particle diameter (nm) | Mohs' hardness | Content (wt. %) | Average degree of aggregation | | |
|---|---|---|---|---|---|---|---|
| Exam. 13 | alumina (δ) | 20 | 7.5 | 0.1 | 20 | 4.3 | 3.4 |
| Exam. 14 | alumina (δ) | 20 | 7.5 | 0.80 | 20 | 4.8 | 3.5 |
| Exam. 15 | alumina (δ) | 20 | 7.5 | 4 | 20 | 4.5 | 6.0 |
| Exam. 16 | alumina (δ) | 100 | 7.5 | 0.33 | 20 | 4.0 | 6.0 |

What is claimed is:

1. A biaxially oriented polyester film having excellent scratch resistance and excellent chipping resistance, said polyester film containing particles (A) having an average primary particle diameter of 5–300 nm, an average degree of aggregation of 10–50 and a Mohs' hardness of 6–10 and said particle (A) being present in the film in an amount of 0.01–5 wt. %.

2. The film according to claim 1 wherein said particles (A) are at least one type of alumina particles having a crystal form selected from the group consisting of β-type, γ-type and δ-type.

3. The film according to claim 2 wherein the amount of the δ-type crystal form alumina particles in said particles (A) is not less than 60% by weight.

4. The film according to claim 1 wherein said particles (A) are at least one type of particles selected from the group consisting of zirconia particles and titanium nitride particles.

5. The film according to claim 1 wherein the average primary particle diameter of said particles (A) is in the range of 10–100 nm.

6. The film according to claim 1 wherein the content of said particles (A) in said film is in the range of -0.1–1 wt. %.

7. The film according to claim 1 wherein the main component of the polyester of said film is at least one kind of polymer selected from the group consisting of polyethylene terephthalate, polyethylene-α,β-bis (2-chlorphenoxy)-ethane 4,4'-dicarboxylate, polyethylene 2,6-naphthalate and polybutylene terephthalate.

8. The film according to claim 1 wherein the shape coefficient of said particles (A) is in the range of 0.85–1.0.

9. The film according to claim 1 wherein the average surface roughness of said film is in the range of 0.003–0.030 μm.

10. The film according to claim 1 wherein the planar orientation index of said film is in the range of 0.935–0.975.

11. The film according to claim 1 wherein the density index of said film is in the range of 0.02–0.05.

12. The film according to claim 1 wherein the friction coefficient of the surface of said film is in the range of STET.

13. The film according to claim 1 wherein the surface specific resistivity of said film is less than $1 \times 10^{15}$ Ω·cm.

14. The film according to claim 1 wherein the orientation ratio in the transverse direction of said film is in the range of 30–80.

15. A biaxially oriented polyester film according to claim 1 further including particles (B) having an average particle diameter of 0.3–3 μm, the Mohs' hardness of said particles (A) being greater than that of said particles (B).

16. The film according to claim 15 wherein the Mohs' hardness of said particles (B) is less than 6.

17. The film according to claim 15 wherein the coefficient of crystallization acceleration of said particles (B) is not greater than 15° C.

18. The film according to claim 15 wherein the content of said particle (B) is in the range of 0.005–1.0 wt. %.

19. The film according to claim 15, wherein said particles (B) are at least one type of particles selected from the group consisting of calcium carbonate particles, calcium phosphate particles, silica particles and particles of cross linked polystyrene.

20. The film according to claim 15 wherein the difference between the Mohs' hardness of particles (A) and the Mohs' hardness of particles (B) is not less than 1.

21. A biaxially oriented polyester film according to claim 1 or 15 further including non-incorporated particles.

22. The film according to claim 21 wherein the average particle diameter of said non-incorporated particles is in the range of 0.2–20 μm.

23. The film according to claim 21 wherein the content of said non-incorporated particles in said film is in the range of 0.01–2 wt. %.

24. The film according to claims 1 or 15 wherein said film is laminated onto at least one surface of a polyester film to form a composite polyester film structure.

25. The film according to claim 21 wherein said film is laminated onto at least one surface of a polyester film to form a composite polyester film structure.

26. The film according to claim 19 wherein the inorganic particles are selected from the group consisting of calcium carbonate particles, calcium phosphate particles and silica particles.

27. A biaxially oriented polyester film having excellent scratch resistance and excellent chipping resistance, said polyester film containing 0.05–5 wt % of particles (A) selected from the group consisting of β-alumina, γ-alumina and δ-type alumina having an average primary particle diameter of 5–200 nm and an average degree of aggregation of 10–50.

28. The film according to claim 27, wherein the particles (A) comprise δ-alumina.

29. The film according to claim 27 or 28, wherein the particles (A) have an average degree of aggregation of 10–50.

30. The film according to claim 27 or 28, further comprising 0.08–0.10 wt. % of inert particles selected from the group consisting of calcium carbonate, calcium phosphate and silica having an average particle size of 0.3–1.5 μm.

31. A biaxially oriented polyester film having excellent scratch resistance and excellent chipping resistance, said polyester film containing 0.02–5 wt % of particles (A) having an average primary particle diameter of 5-250 nm, an average degree of aggregation of 10-50 and a Mohs hardness of at least 7 and 0.005-1.0wt % of particles (B) having a Mohs hardness less than the Mohs hardness of the particles (A).

32. The film according to claim 31, wherein the particles (A) are selected from the group consisting of β-alumina, γ-alumina and δ-alumina.

33. The film according to claim 32, wherein the particles (A) comprise δ-alumina.

34. The film according to claim 31 or 32, wherein the particles (A) have an average degree of aggregation of 10-50.

35. The film according to claim 31 or 32, wherein the particles (B) are selected from the group consisting of calcium carbonate, calcium phosphate and silica and have an average particle size of 0.3-2 μm.

* * * * *